(12) United States Patent
Bruls et al.

(10) Patent No.: US 8,571,101 B2
(45) Date of Patent: Oct. 29, 2013

(54) METHOD AND SYSTEM FOR ENCODING A VIDEO SIGNAL, ENCODED VIDEO SIGNAL, METHOD AND SYSTEM FOR DECODING A VIDEO SIGNAL

(75) Inventors: Wilhelmus Hendrikus Alfonsus Bruls, Eindhoven (NL); Arnaud Pierre Herve Bourge, Paris (FR)

(73) Assignee: Koninklijke Philips N.V., Einhoven (NL)

( * ) Notice: Subject to any disclaimer, the term of this patent is extended or adjusted under 35 U.S.C. 154(b) by 1140 days.

(21) Appl. No.: 12/521,886

(22) PCT Filed: Jan. 4, 2008

(86) PCT No.: PCT/IB2008/050014
§ 371 (c)(1),
(2), (4) Date: Jul. 1, 2009

(87) PCT Pub. No.: WO2008/084417
PCT Pub. Date: Jul. 17, 2008

(65) Prior Publication Data
US 2010/0014585 A1    Jan. 21, 2010

(30) Foreign Application Priority Data
Jan. 12, 2007  (EP) .................................. 07100470

(51) Int. Cl.
H04N 7/12       (2006.01)
H04B 1/66       (2006.01)

(52) U.S. Cl.
USPC ...................................... 375/240.12

(58) Field of Classification Search
None
See application file for complete search history.

(56) References Cited

U.S. PATENT DOCUMENTS

| | | | | |
|---|---|---|---|---|
| 5,909,224 | A * | 6/1999 | Fung | 345/531 |
| 5,926,225 | A * | 7/1999 | Fukuhara et al. | 348/416.1 |
| 7,145,948 | B2 * | 12/2006 | Ye et al. | 375/240.03 |
| 7,289,675 | B2 * | 10/2007 | Rose | 382/238 |
| 7,728,878 | B2 * | 6/2010 | Yea et al. | 348/218.1 |
| 7,894,524 | B2 * | 2/2011 | Demos | 375/240.15 |
| 7,995,656 | B2 * | 8/2011 | Chen et al. | 375/240.23 |
| 2006/0230162 | A1* | 10/2006 | Chen et al. | 709/229 |
| 2007/0183499 | A1* | 8/2007 | Kimata et al. | 375/240.16 |
| 2007/0230564 | A1* | 10/2007 | Chen et al. | 375/240.01 |

OTHER PUBLICATIONS

Ohm, J.: "Advances in Scalable Video Coding"; Proceedings of the IEEE, vol. 93, No. 1, Jan. 2005, pp. 42-56.
"Advanced Video Coding for Generic Audiovisual Services"; ITU-T Standard Superseded (S), International Telecommunication Union, Geneva, CH, No. H264 May 30, 2003, 281 Page Document.

* cited by examiner

Primary Examiner — Nhon Diep (57) ABSTRACT

Some video compression standards use multiple temporal predictions. One or more of the oldest temporal predict ions are overwritten with another prediction. A prediction used in an enhancement encoder is in embodiment overwritten by a prediction produced in a base stream encoder.

38 Claims, 9 Drawing Sheets

ME/MC=Motion estimation, Motion compensation

ME/MC=Motion estimation, Motion control

$\underline{I}_0 B_1 \underline{P}_2 B_3 \underline{P}_4 B_5 \underline{P}_6$ (display order)

| #ref = 3 | 1 | 2 | 3 | 4 | 5 | 6 | 7 | |
|---|---|---|---|---|---|---|---|---|
| | | $\underline{I}_0$ | $\underline{P}_2$ | $B_1$ | $\underline{P}_4$ | $B_3$ | $\underline{P}_6$ | $B_5$ (coding order) |
| mem 0 | | $\underline{I}_0$ | $\underline{P}_2$ | $\underline{P}_2$ | $\underline{P}_4$ | $\underline{P}_4$ | $\underline{P}_6$ | $\underline{P}_6$ |
| mem 1 | | | $\underline{I}_0$ | $\underline{I}_0$ | $\underline{P}_2$ | $\underline{P}_2$ | $\underline{P}_4$ | $\underline{P}_4$ |
| mem 2 | | | | $B_1$ | $\underline{I}_0$ | $\underline{I}_0$ | $\underline{P}_2$ | $\underline{P}_2$ |
| mem 3 | | | | | $B_1$ | $B_3$ | $B_3$ | $B_5$ |
| Displayed | | - | - | $\underline{I}_0$ | $\underline{B}_1$ | $\underline{P}_2$ | $B_3$ | $\underline{P}_4$ |

$\underline{I}_0\ \underline{P}_2\ \underline{P}_4\ \underline{P}_6$ are referenced frames $B_1\ B_3\ B_5$ are non-referenced frames

METHOD AND SYSTEM FOR ENCODING A VIDEO SIGNAL, ENCODED VIDEO SIGNAL, METHOD AND SYSTEM FOR DECODING A VIDEO SIGNAL

FIELD OF THE INVENTION

The invention relates to the general field of video coding (or video compression), and in embodiments to so-called scalable video coding. It presents a method and system for encoding a video signal wherein, image compression, for instance scalable image compression is performed and multiple temporal predictions are used wherein multiple frames are stored in a memory.

The invention also relates to the encoded, e.g. scalable video signal and to a method and system for decoding a video signal.

DESCRIPTION OF PRIOR ART

Image display systems often receive compressed data streams. A variety of image compression techniques are known to reduce the amount of image data that must be stored or transmitted. In video compression use is made of prediction, wherein the content of a frame or part of a frame is predicted from the content of one or more previous received or generated frames. In video signal processing the signal is comprised of intracoded and interceded frames, for instance I-frames, P-frames and B-frames. The I-frames are intracoded. The P- and B-frames are referred to as interceded frames. Intra-code frames can be reconstructed without any reference to other frames; interceded frames are reconstructed using data of other frames (forward or backward prediction). The P- and B-frames only contain information or changes between the I-frames, often expressed in motion vectors for macroblocks. In standard video signal processing the referral is relatively simple, and at most two frames are referred to, the P frames are forwardly predicted from I frames and the B frames are forwardly and backwardly predicted from I and P-frames. Using motion estimation motion vectors can be found which are used for motion estimation of parts (macroblocks) of a frame. Some more complex video compression standards such as the AVC compression standard have a possibility of many multiple predictions. A relatively large number of temporal (i.e. forward or backward) predictions are made. Not just the nearest frames in time are considered for making the predictions, but also frames further removed in time. In a buffer several frames are stored in a memory to be used for temporal prediction. As time progresses the frames are shifted through a buffer in the memory and the oldest are bumped out of the buffer as a new 'fresh' frame is stored.

Although the existing schemes are useful, the inventors have realized that a possibility exists for improvement of encoding. The known methods have a restriction on the prediction. By lifting the restriction new possibilities are opened without requiring major changes to existing (scalable) video coding, and thus providing novel opportunities which are easy to deploy industrially.

SUMMARY OF THE INVENTION

To this end the method in accordance with the invention is characterized in that a prediction frame in memory is overwritten with a separately produced prediction frame.

"Separately produced" means within the framework of the invention from outside the normal (temporal) procedure for generating a prediction frame. Prediction frames are for instant e.g. produced in an enhancement encoding part of an encoder, prediction frames that are produced in a base stream encoding part are produced separately from the enhancement part of the encoder (although still within the encoder, when seen in a larger sense). A prediction frame longest in memory the oldest of the prediction frames in memory, or one of a subset of oldest prediction frames.

The invention is based on the following insight:

In the standard several temporal predictions are used. The longer a frame is in store, the lower on average the importance of the temporal prediction based on that frame. In the invention the dogma of temporal prediction is bypassed by using the space reserved for one or more of the temporal predictions for a separate prediction. This will decrease slightly the accuracy of the temporal prediction based on the conventionally produced prediction frames. However, the overwritten information is relatively redundant/less useful. Overwriting the information therefore very often does not seriously decrease image quality. The information that can be written in the overwritten slots, however, opens up possibilities that are, with the present standards, not achievable, or only with very complex changes to existing procedures so that they are no longer compatible to existing standards and/or necessitate a large increase in bits in the video signal. In simple embodiments of the invention the overwritten prediction is one of the oldest predictions. The oldest (longest in memory) predictions usually are the least important. Alternatively the method may comprise an algorithm to select the least important prediction(s) prior to overwriting.

The method in accordance with the invention does not require more bits or major changes to the existing AVC standard.

In an embodiment of the invention the memory is a memory in an enhancement encoder/decoder and the separately produced frame is an upscaled/de-interlaced frame from a base encoder/decoder. This enables, without any syntax change, to use the standard AVC for scalable compression.

In another embodiment the external frame comprises depth views.

This allows generating 3D video multiview coding.

Figure 7:
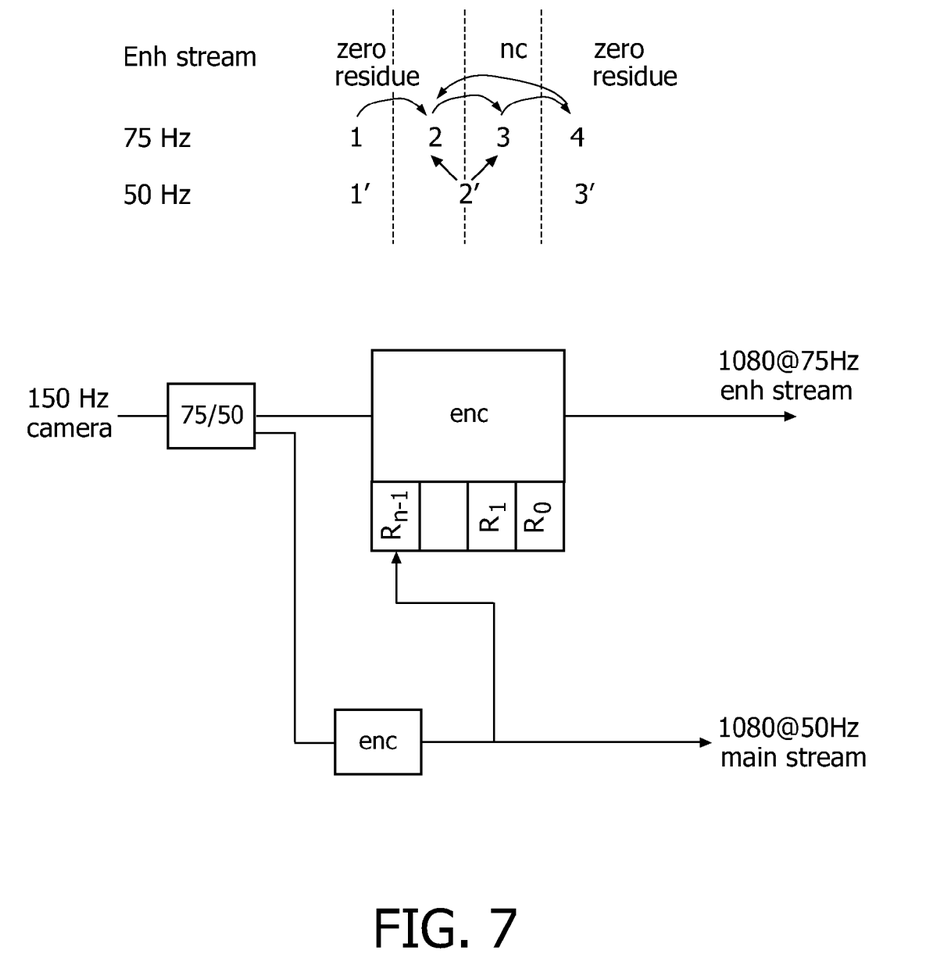
FIG. 7 illustrates a further embodiment of the invention wherein the base stream and the enhancement stream have different frame rates.

In yet another embodiment, illustrated by FIG. 7, the enhancement stream provides a higher frame rate, with a ratio different from 2. A envisioned application for such a case is a base layer at 50 Hz intended for television sets, and an enhancement layer at 75 Hz intended for computer LCD panels (or any other advanced display). Indeed, increasing the frame rate to at least 75 Hz gives significant improvements while it demands a lower bit-rate increase than going directly to 100 Hz. Moreover, 75 Hz is the native refresh rate of many displays (mainly in the computer world). Hence, a 50/60 Hz solution compatible with 75/90 Hz enhancement is to be preferred, but can be realized neither with MPEG2 nor with SvC.

This compatibility can efficiently be realized based on the present invention.

BRIEF DESCRIPTION OF THE DRAWINGS

These and other advantageous aspects of the invention will be described in more detail using the following figures.

FIGS. 1a to 1c show the processing flow of a post-processing method, including a method for encoding (FIG. 1a) and decoding (FIG. 1b) according to an embodiment of the invention, wherein

The figures are not drawn to scale. Generally, identical components are denoted by the same reference numerals in the figures.

DETAILED DESCRIPTION OF PREFERRED EMBODIMENTS

In short the invention may be described as follows:

Some video compressions standards have a possibility of using a multitude of predictions for e.g. motion estimation/motion compensation. The inventors have realized that some of these predictions are more redundant or less useful, e.g. when using AVC multiple temporal predictions are use and the IC is predesigned to be able to deal with this. In the invention the dogma of temporal prediction is bypassed by overwriting a last of these predictions (i.e. usually the least accurate, especially for wild motion) to encode another prediction. The decoder behaves similarly.

Figure 1A:
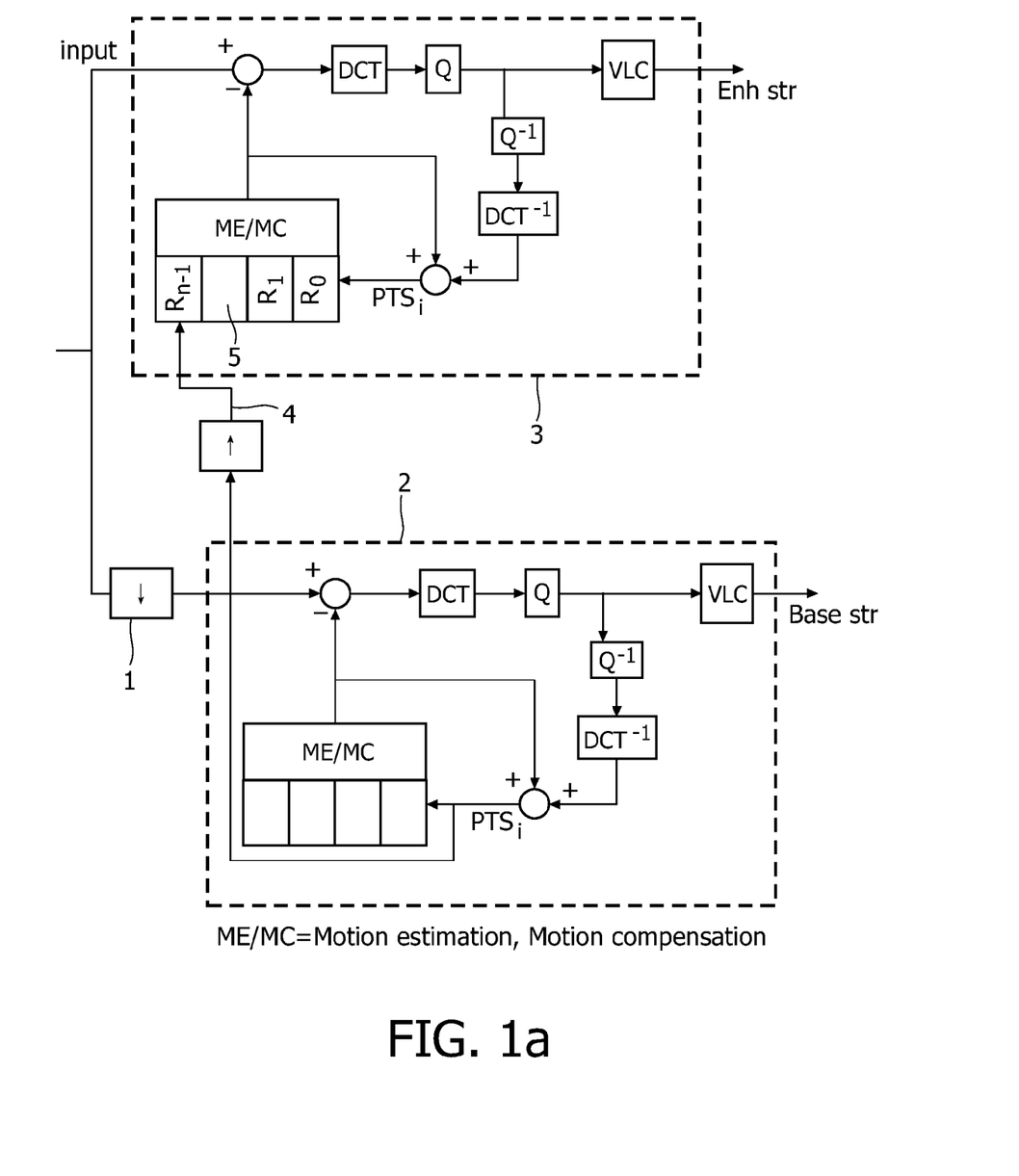
Figure 1B:
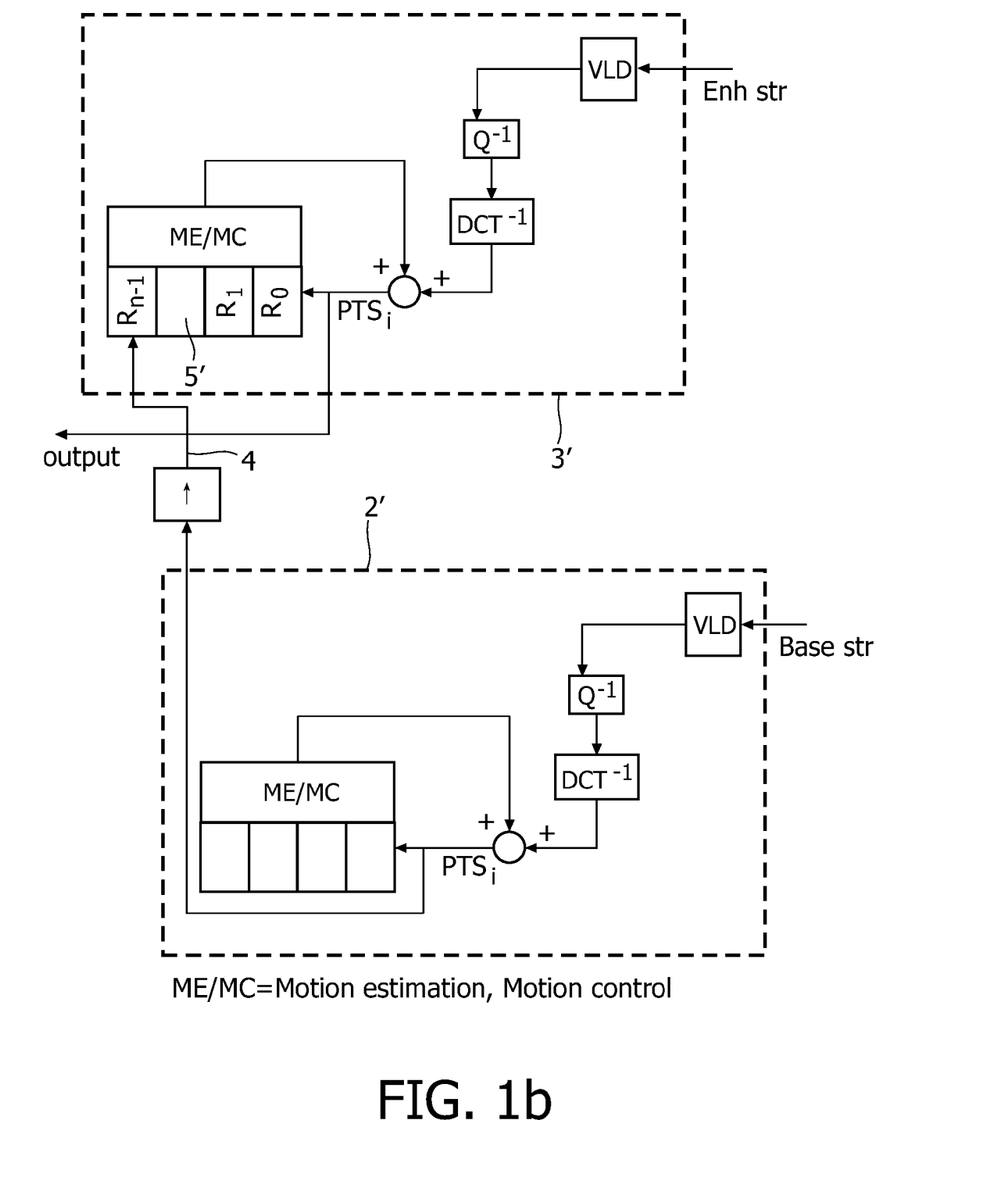
Figure 1C:
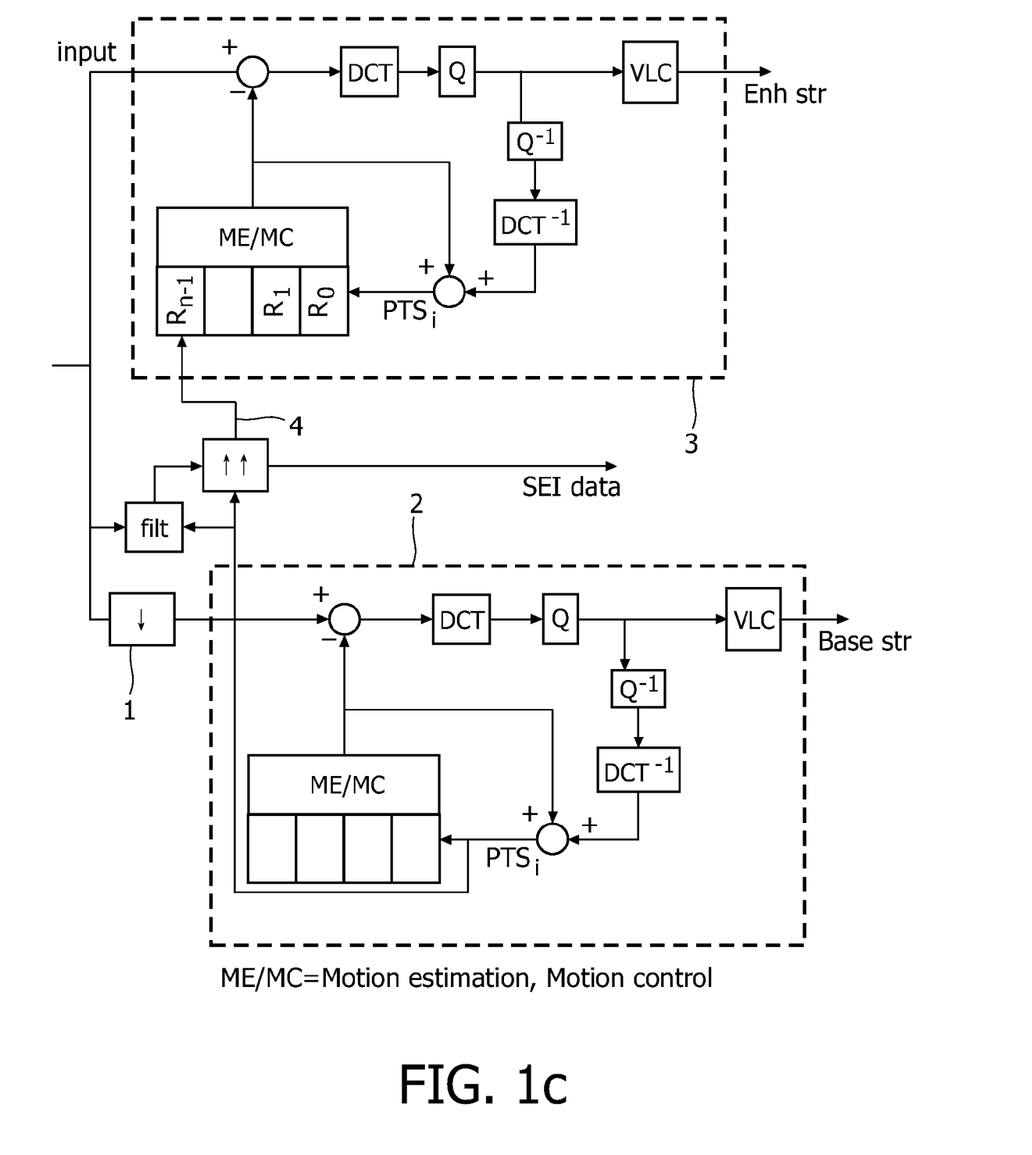
FIG. 1c illustrates a more complex embodiment.

FIG. 1 shows a processing flow of an embodiment of our invention used an encoding and decoding method. This is illustrated in the following:

Encoder Side:

FIG. 1a illustrates an embodiment of the method and system in accordance with the invention.

The abbreviations used in the figures stand for:
DCT: Discrete Cosine Transform
Q: Quantization
$DCT^{-1}$: inverse Discrete Cosine Transform
$Q^{-1}$: inverse quantization
VLC: Variable Length Coding
Base str: Base stream
Enh str: enhancement stream
ME/MC: Motion estimation/Motion compensation
$R_0$, $R_1$ etc: frames in the memory used in the ME/MC
$MB_i$: MacroBlock i
$PTS_i$: Presentation Time Stamp i
AVC: Advanced Video coding, advanced video coding are for instance H.264 and MPEG4.10 coding standards.
SEI: Supplemental Enhancement Information.

FIG. 1a illustrates a method in which use is made of a base stream and an enhancement stream. The massive amounts of data inherent in many image transmission method pose significant problems. More particularly, each digital image frame is a still image formed from an array of pixels according to the display resolution of a particular system. As a result, the amounts of raw digital information included are often massive. In order to reduce the amount of data that must be sent, compression schemes are used to compress the data. Various video compression standards or processes have been established, including, MPEG-2, MPEG-4, and H.263.

Many applications are enabled where the image data is available at various resolutions and/or qualities in one stream. Methods to accomplish this are loosely referred to as scalability techniques. There are three axes on which one can deploy scalability. The first is scalability on the time axis, often referred to as temporal scalability. Secondly, there is scalability on the quality axis, often referred to as signal-to-noise scalability or fine-grain scalability. The third axis is the resolution axis (number of pixels in image) often referred to as spatial scalability or layered coding. In layered coding, the bitstream is divided into two or more bitstreams, or layers. Each layer can be combined to form a single high quality signal. For example, the base layer may provide a lower quality video signal, while the enhancement layer provides additional information that can enhance the base layer image. FIG. 1a illustrates a method and system for providing a layered signal, in this case have a base stream (base str) and an enhancement stream (base str), sometimes also called an enhancement layer.

The input is split and sent to a base encoder 2 after having passed a low pass filter 1, for instance a nyquist filter. The signal undergoes in the base encoder a disctret cosine transformation (DCT), or any other similar transformation, such as for instance using wavelets, and is quantized (Q; on the resulting data stream variable length coding is performed providing the base stream to be sent and/or stored. In video signal processing the signal is often comprised of intracoded and interceded frames, for instance I-frames, P-frames and B-frames. The I-frames are intra-coded. The P- and B-frames are referred to as interceded frames. Intra-code frames can be reconstructed without any reference to other frames; interceded frames are reconstructed using data of other frames (forward or backward prediction). The P- and B-frames only contain information or changes between the I-frames, often expressed in motion vectors for macroblocks. In order to find the differences the original signal has to be reconstructed inside the encoder. This is done by a reverse quantization ($Q^{-1}$) and a reverse Discrete Cosine Transform ($DCT^{-1}$). The resulting reconstructed frames are used inside the encoder for estimating motion vectors. In a simple arrangement only one reconstructed frame is used for motion estimation and motion compensation. However, in more complex methods and systems a number of reconstructed frames are used. This may be useful since reconstruction introduces errors which may be larger for some reconstructed frames then for others and also it may be that the previous frame is not necessarily the best frame to take as a strating position for estimation of motion vectors of differences between frames. The encoder comprises a shift register wherein for comparison the data of a number of reconstructed frames are stored in a shift register for use in the motion estimation and/or motion estimation, i.e. in prediction. Some more complex video compression standards such as the AVC compression standard have a possibility of many multiple predictions. A relatively large number of temporal (i.e. forward or backward) predictions are made. Not just the nearest frames in time are considered for making the predictions, but also frames further removed in time. In a buffer several frame are stored in a buffer to be used for temporal prediction. As time progresses the frames are shifted through the buffer and the oldest are bumped out of the buffer as a new 'fresh' frame is stored.

The resulting base stream can be broadcasted, received and via a decoder, displayed as is, although the base stream does not provide a resolution which would be considered as high-definition.

In FIG. 1a the system comprises also an enhancement encoder 3. In the enhancement encoder 3 a similar method is performed as in the base stream encoder 2, with only this difference that the enhancement stream (i.e. the difference between the original signal and the base stream) is treated. The enhancement decoder comprises a means for Discrete Consien Transform and qunatization of the enhanced layer signal, and for reconstructing ($DCT^{-1}$, $Q^{-1}$). The reconstructed data of the enhancement stream for frames $R_0$, $R_1$ etc, are stored and used for motion estimation and motion compensation for the enhancement stream. A person skilled in the art will be familiar with these methods.

The inventors have realized that the stored frames do not all have the same relevance, in particular, but not exclusively the least longest remaining frames may well be less important. The longer a frame is in store, the lower on average the importance of the temporal prediction based on that frame. In the invention the dogma of temporal prediction is bypassed by using the space reserved for the last of the temporal predictions (i.e. the 'oldest frames') for a separate prediction. This will decrease slightly the accuracy of the temporal prediction. However, the overwritten information is relatively redundant/less useful. Overwriting the information therefore very often does not seriously decrease image quality. The information that can be written in the overwritten slots, however, opens up possibilities that are, with the present standards, not achievable, or only with very complex changes to existing procedures so that they are no longer compatible to existing standards and/or necessitate a large increase in bits in the video signal. The invention could be used by overwriting one or more of the oldest frames.

FIG. 1a illustrates an embodiment of the method and system of the invention. The oldest data in the memory in the enhancement encoder is overwritten by an upscaled/interlaced frame produced in the base encoder. Thus before encoding the last (longest in memory 5 of the enhancement encoder) reference frame $R_{n/1}$ in the enhancement encoder 3 is overwritten with an upscaled/de-interlaced frame 4 from the base encoder/decoder 2 with also PTSi (Presentation Time Stamp i). The frame longest in memory in the memory 5 of the enhancement encoder 3 is thus overwritten by a separately produced frame, namely an upscaled/de-interlaced frame 4 from the base stream encoder 2. Although this may slightly decrease the accuracy of the motion estimation/motion compensation performed inside the enhancement encoder this allows, without any syntax change, to use AVC for scalable compression. This is e.g. relevant to introduce 1080p HDTV at full frame rate in a backwards compatible way (to 720p or 1080i HDTV). The principle also works for non-scalable compression. FIG. 1a shows a scalable encoder. Because resources are limited to 180i, the scheme according to the invention enables with only minor modification to a silicon 1080p. The last prediction $R_{n-1}$ now e.g. contains a smart content adaptive upscaling candidate. As a more elaborate embodiment e.g. the last two 'normal' temporal predictions ($R_{n-1}$, $R_{n-2}$) could be overwritten be e.g. the predictions (frames) produced by using two different de-interlacing algorithms.

In embodiments only the oldest frame in memory in the enhancement encoder is overwritten. Within the scope of the invention, dependent on the number of frames in memory more than one of the oldest frames could be overwritten. Also, in this embodiment a simple choice is made, the oldest frame is overwritten. In embodiments, one of the last n frames could be overwritten wherein a choice is made which one is overwritten on basis of an estimation of the importance (ranking) of the set of oldest to be overwritten frames, the overwritten frames than need not necessarily be the very oldest frame, but could be the next to oldest frame.

FIG. 1b shows the decoder side. VLD stands for variable length decoding. A frame 4 produced in the base stream decoder 2' is used to overwrite frame prediction frame $R_{n-1}$ in memory 5' of the enhancement decoder.

FIG. 1c illustrates for a more complex embodiment of the design shown in FIG. 1a. The difference is that a filter is used and furthermore that the data relating to the filter and the upscaling are inserted into SEI (Supplemental Enhancement Information). These data is used in a decoder to establish at the decoder end the same parameters for filtering and upscaling, so that parameters used in the method of encoding in the encoder can be used in the decoding as well.

In this embodiment, when a frame "from outside" is put in the decoded pictures buffer, it is given an old cts (composition timestamp) so that it will never be displayed, and also it is marked as "long-term reference" so that it is not bumped out of the memory.

Figure 2:
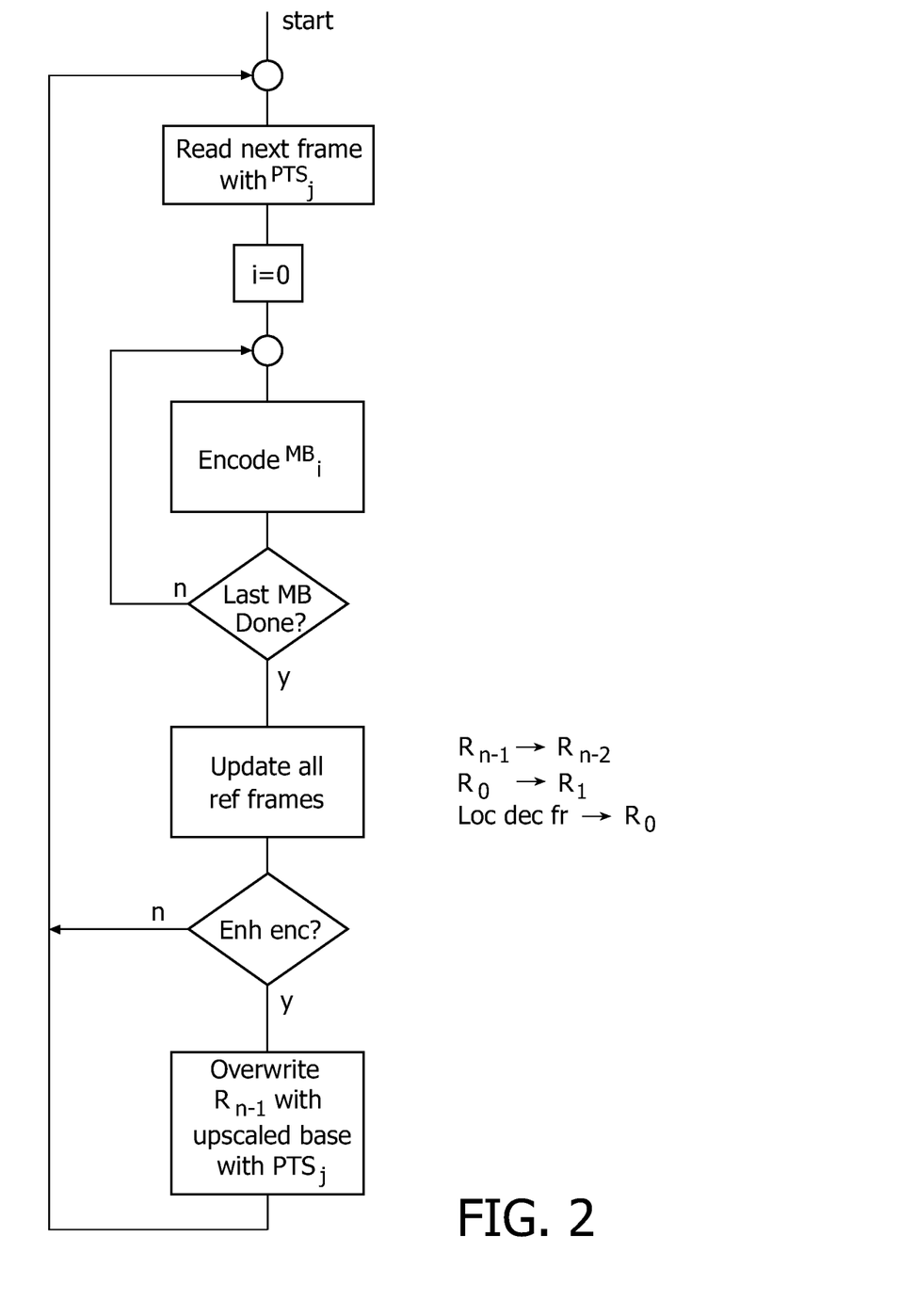
FIGS. 2 to 5 further illustrate the embodiment of the invention as shown in FIGS. 1a to 1c.

FIG. 2 illustrates in a flow diagram the different steps within the enhancement to ensure that the external frame (upscaled base with PTS$_j$) does overwrite frame $R_{n-1}$ in the memory.

The basic insight of the invention, namely that the prediction frame longest in memory is overwritten with an externally produced prediction frame is not just useful in the embodiment illustrated in FIGS. 1a to 1c.

Figure 2B:
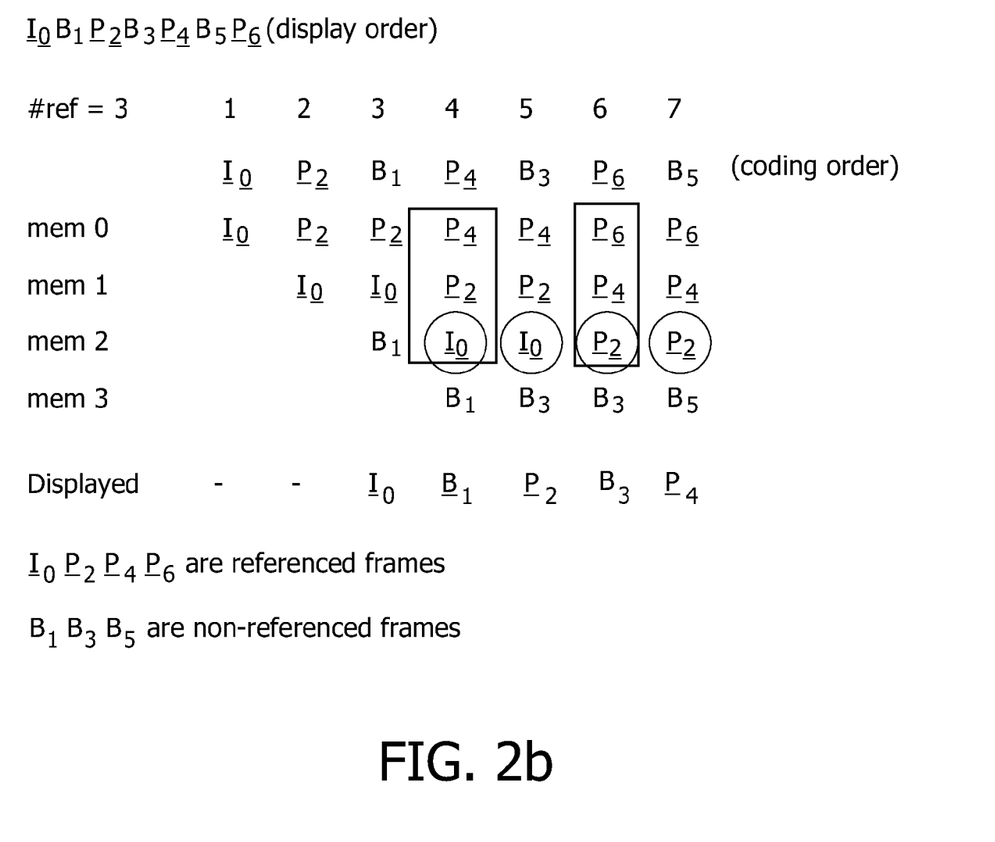

Another option is given in FIG. 2b; it gives an example when it is safe to overwrite a reference frame in memory. Here is important that a frame is only overwritten when it already has been sent to the output (display). As the frame come in the memory is filled with the frame (memory 0, memory 1 etc). In this set-up the number of reference frames is three. This means that the first three frames it is impossible to overwrite frames, since we need three frames. When a frame has been displayed, that frame can be overwritten in the memory. In this example thus the frames which have been placed inside the circles can be overwritten. It is to be noted that these frames are oldest frames, but not necessarily the oldest frame in memory. In column 4 for instance the already displayed $I_0$ frame can be overwritten, but not the as yet not displayed $B_1$ frame. The rectangle denote frames used for reference for $B_3$ and $P_6$ (first rectangle) and $B_5$ and $P_7$ (last rectangle).

Figure 3:
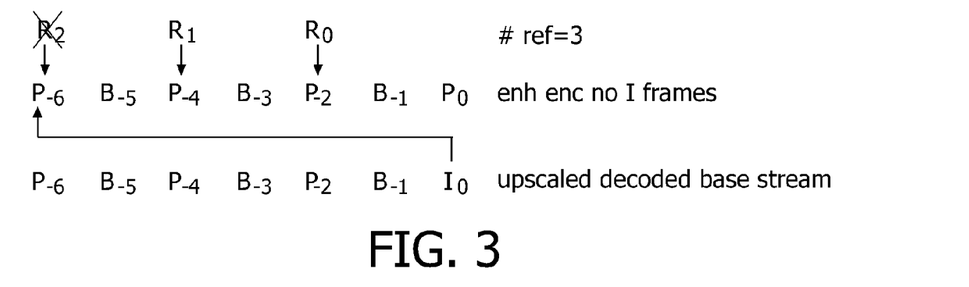

FIG. 3 illustrates an embodiment wherein an upscaled decoded $I_0$ base stream frame overwrites in the memory (buffer) of the enhancement encoder/decoder the last reference prediction frame ($R_2$) in the enhancement encoder/decoder, which in this example is $P_{-6}$.

Figure 4:
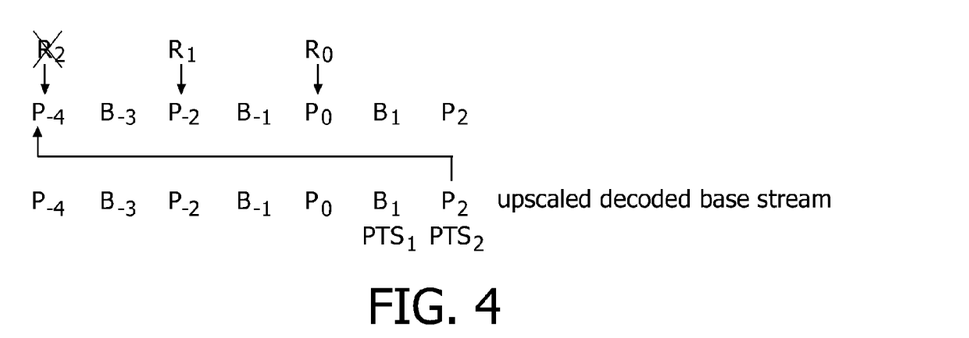

FIG. 4 illustrates an embodiment wherein an upscaled decoded $P_2$, with time stamp PTS2; base stream frame overwrites in the memory (buffer) of the enhancement encoder/decoder the last reference prediction frame ($R_2$) in the enhancement encoder/decoder, which in this example is $P_{-4}$.

Figure 5:
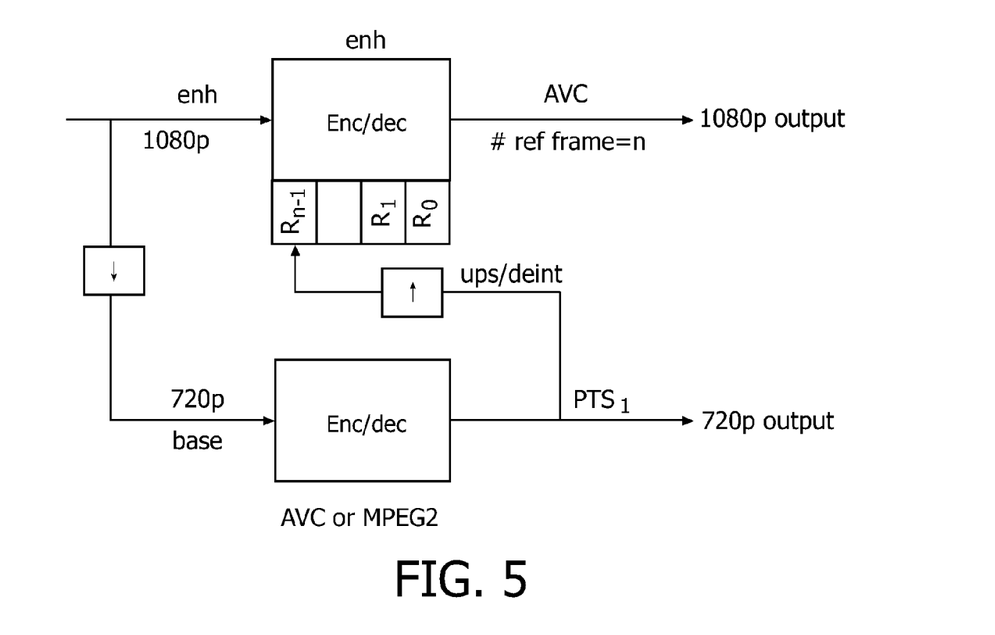

FIG. 5 illustrates an embodiment in which the base stream has a 720p output and the enhancement stream a 1080p output. An upscaled/deinterlaced base stream frame with time stamp PTS1 overwrites frame $R_{n-1}$ in the memory of the AVC enhancement encoder. This allows to introduce 1080p HDTV at full frame rate in a backwards compatible way (to 720p or 1080i HDTV), which is not possible or at much greater costs with known methods.

Also we can apply in this principle of overwriting one of more reference frames to the multiview case, so that we also don't have to change any syntax, and basically can use regular AVC also for this application.

There have been attempts for efficient compression of multiview cases. In mpeg it has already being recognized that normal AVC making use of hierarchical B frames can be used for efficient compression of multiview video. In such methods the frames of the different views are interleaved and it is made sure the non-reference (non-C) view frames are being of the type hierarchical B (stored B, Bs). This allows for each MB both spatial (neighbor) as temporal prediction (from same view).

Especially the case with one center view (C) and one left (L) view and one (R) view is very interesting for stereoscopic video. Here the center view C would be the reference view and L & R views would be hierarchical B frames.

Although the current best solution (AVC+hierarchical B frames) is a big improvement, still the bitrate of the 3 view AVC stream is high for many applications with respect to just a AVC C stream (1+2*0.4/0.5)=1.8.2*.

In MPEG people are trying to extend AVC with new modes (new syntax), to include IBR (image rendering out of 2D+depth) as new prediction modes in order to improve the efficiency of the multiview AVC encoder. But this will present difficulties with respect to implementation, because of the many changes this means to AVC.

The inventors have however realized that the basic concept of the invention, i.e. principle of overwriting one of more reference frames to the multiview case, can be used, so that we also don't have to change any syntax, and basically can use regular AVC also for this application.

Figure 6:
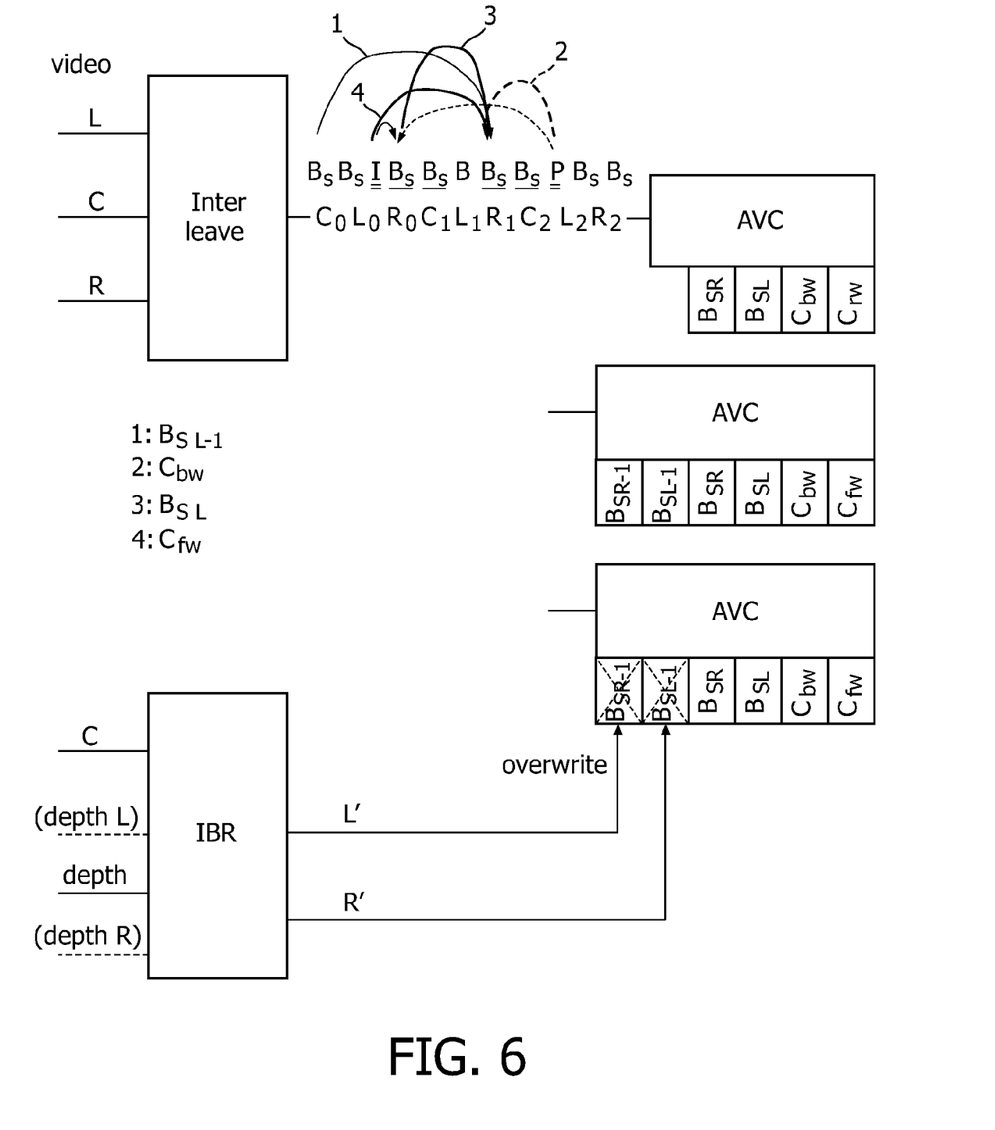
FIG. 6 illustrates a second embodiment of the invention.

This is illustrated in FIG. 6, wherein the minimum number of reference frames would be normally 4, see a), wherein in the memory of the AVC encoder four reference frames are used, namely Cfw, Cbw, Bsr, Bsl.

This number of reference frames course could be enlarged (see FIG. 6b Cfw, Cbw, Bsr, Bsl, Bsr-1, Bsl-1) and this would give some (limited) gain. This situation is depicted in b).

For a real 3D application would require also 3 depth views. With these depth views and the C view, we can apply IBR (image based rendering) to create approximations (predictions) of L' and R'. The predictions can overwrite the less important reference frames every time before starting coding a new frame (see FIG. 6c).

The gain now will be much larger as in illustrated in part c) compared to b).

A third application enabled by this invention is creating an enhancement stream for a higher frame rate with a different ratio then power of 2.

Indeed, a decoded frame of the 50 Hz sequence is put in the reference list of the 75 Hz sequence, according to the general scheme of this invention. This prediction frame from the 50 Hz sequence is a good predictor and helps reaching a better coding efficiency because it is temporally very close to the frame to encode in the 75 Hz version. Looking at FIG. 7, where frame i belongs to the enhanced 75 Hz sequence, and frame i' belongs to the base 50 Hz sequence:

frame 1' has the same temporal location as frame 1
frame 2' is temporally closer to frame 2 than any frame in the 75 Hz sequence
frame 2' is temporally closer to frame 3 than any frame in the 75 Hz sequence
frame 3' has the same temporal location as frame 4
etc.

In short the invention can be described by:

Some video compression standards use multiple temporal predictions. One or more of the oldest temporal predictions are overwritten with another prediction. A prediction used in an enhancement encoder is in embodiment overwritten by a prediction produced in a base stream encoder. In another embodiment a temporal prediction is overwritten by a 3D view.

The invention relates to a method and system of encoding, as well as to a method and system of decoding, as described above by way of example.

The invention is also embodied in a video signal comprising encoded video signals and control information comprising e.g. functional parameters for use in the method of decoding. The control information may comprise data in accordance with any, or any combination, of the embodiments described above.

The control information enclosed in the video signal according to the present invention may comprise one or more of the following information:
A: general information, i.e. applicable for the whole of the video signal
1. That the method is used for encoding the video signal, this is useful if there is, in the future there is only one standard method used
2. That a particular embodiment of the method is used for encoding the video signal
3. Parameters used in the method, such parameters may be for instance
    The particular prediction to be overwritten (the longest in memory, or the two longest in memory, or the next to longest in memory.
    Parameters used throughout the encoding of the video signal, such as parameters for filters, upscaling algorithms or algorithms to determine which of the predictions is to be overwritten.
B: particular, dynamic information.
    If the video signal is generated dynamically, i.e. certain choices made during encoding are dependent on the video content; the choices made in the encoder may be included into the encoded video signal. For instance, if the encoding method comprises an algorithm to make a decision as to which one of the prediction is to be overwritten for instance by estimating the importance of the to be overwritten prediction possibly in comparison to the prediction that will overwrite, there is a choice of including the details of said selection algorithm(s) into the video signal (and thus including general information into the video signal). However, this only works if the decoder comprises said algorithm. If the decoder does not, the particular dynamic information may be sent, i.e. it is specified for a particular part of the video signal (for instance by a flag) that a particular prediction is to be overwritten.

The video signal may comprise general information as well as dynamic information. All of the above types of information, as well as any other type of information relating to the use of the method according to the invention are called within the framework of the application a parameter. Parameters may thus be simple yes/no parameters (point A1 above), parameters indicating a choice within a set of possibilities (point A2 above for instance), or a parameter for control of a step within the method (point A3 above) or dynamic parameters (point B above) in any shape or form.

FIG. 8 specifies again the most generic apparatus (corresponding to most generic method) of the invention. In a video compression which allows a prediction unit 801 to apply a criterion SEL_F( ) upon several predictions generated by similar prediction units T, T2, which do e.g. a lossy transformation and motion compensation (e.g. in AVC, the temporal prediction can result from a combination of several previous images), one of these "standard" modes may be "re-used" by storing data from a separate prediction from another prediction unit PR_UN (i.e. in the sub-memory MEM_P2, a coarsely quantized first prediction, e.g. a wavelet approximation, is overwritten by another predicted region, by another algorithm from PR_UN). This new prediction mode can then be easily be introduced in an existing standard (whatever one likes). The selection criterion SEL_F( ) may also be changed.

Figure 8:
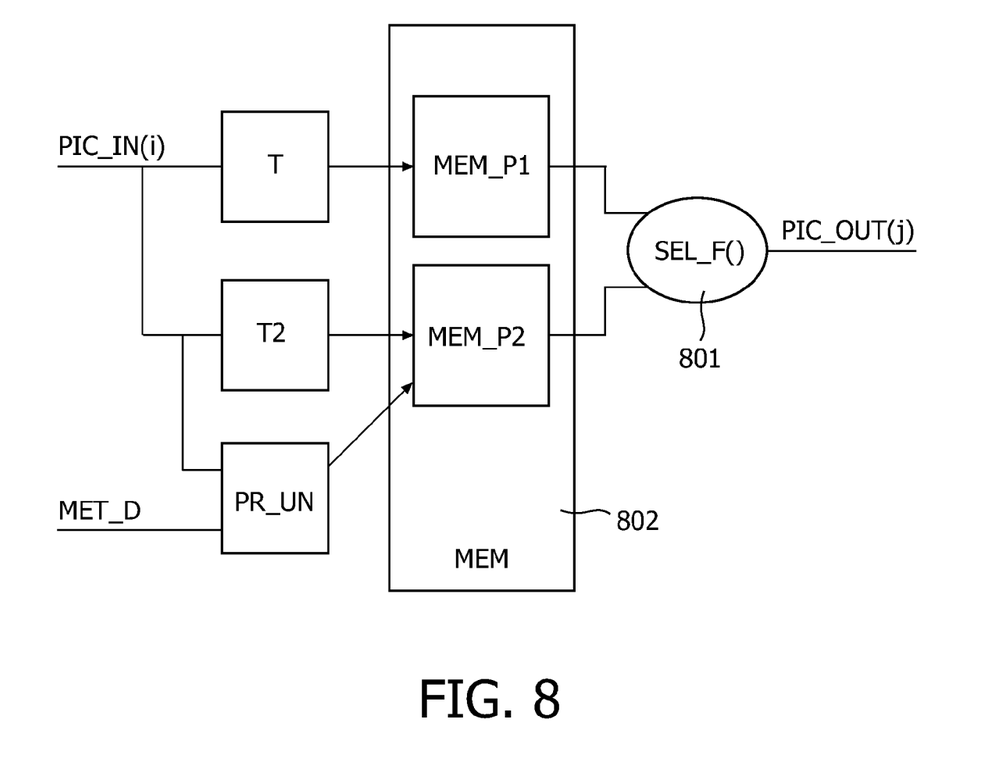
FIG. 8 shows the basic principle of a video compression apparatus having prediction memories (typically for temporal prediction) wherein at least one of the less usable ones is used for storing a prediction of an alternative predicting means.

The other prediction unit may e.g. use a texture synthesis. If the encoder side recognizes there are e.g. patches (e.g. blocks) of grass, a comparison criterion or prediction may be used which just uses synthetically generated grass (e.g. typically with no residue update). This may then be selected as the best quality/compressed region compared to e.g. the temporal prediction. The decoder will then also apply the grass generation (it need not even receive temporal predictive information for that region). All kinds of improved predictions can be generated by prediction unit PR_UN, e.g. by applying some image transformation such as sharpening or smoothing on some image data (or two different de-interlacing algorithms in the two last, least accurate temporal prediction memories, which form then competitive predictions with e.g. a temporal prediction), or a 3D model (e.g. generated from a couple of time sequential images), etc.

Such synchronization data may also be transmitted via the standardized compressed image signal, e.g. in SEIs.

The invention is also embodied in any computer program product for a method or device in accordance with the invention. Under computer program product should be understood any physical realization of a collection of commands enabling a processor—generic or special purpose—, after a series of loading steps (which may include intermediate conversion steps, like translation to an intermediate language, and a final processor language) to get the commands into the processor, to execute any of the characteristic functions of an invention. In particular, the computer program product may be realized as data on a carrier such as e.g. a disk or tape, data present in a memory, data travelling over a network connection—wired or wireless—, or program code on paper. Apart from program code, characteristic data required for the program may also be embodied as a computer program product.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

It will be clear that within the framework of the invention many variations are possible. It will be appreciated by persons skilled in the art that the present invention is not limited by what has been particularly shown and described hereinabove. The invention resides in each and every novel characteristic feature and each and every combination of characteristic features. Reference numerals in the claims do not limit their protective scope.

For instance, the method may de used for only a part of the image, or different embodiments of the method of the invention may be used for different parts of the image, for instance using one embodiment for the center of the image, while using another for the edges of the image.

Use of the verb "to comprise" and its conjugations does not exclude the presence of elements other than those stated in the claims. Use of the article "a" or "an" preceding an element does not exclude the presence of a plurality of such elements.

The invention is described in respect of frames. Within the framework of the invention "frame" could be a part of a frame if for instance the method in accordance with the invention is done on a part of the frame, for instance only the middle part of the video or only foreground parts of a video.

The invention claimed is:

1. A method for encoding a video signal wherein image compression is performed and multiple temporal predictions are used wherein multiple prediction frames are stored in a memory of an enhancement stream encoder wherein a temporal prediction frame ($R_n$1) stored in said memory is overwritten with a separately produced prediction frame derived from a base stream encoder.

2. The method of claim 1, wherein the overwritten prediction frame in said memory is one or more of the prediction frames longest in said memory.

3. The method of claim 2, wherein the one or more of the prediction frames longest in said memory is one of: the longest prediction frame in memory, the two longest prediction frames in said memory, the next to longest prediction frame in said memory.

4. The method of claim 1, wherein the frame derived from the base stream encoder is an upscaled/de-interlaced frame.

5. The method of claim 1, wherein the temporal prediction frame is overwritten with a view based on a depth frame from a depth base stream encoder and a frame from a view base stream encoder.

6. The method of claim 1, wherein the frame rates for enhancement stream and base stream differ by a factor different from 2.

7. The method of claim 1, wherein scalable compression is performed.

8. A non-transitory computer readable media encoded with a video signal comprising image data and control information wherein the control information comprises one or more parameters for use in the method of claim 1.

9. A non-transitory computer readable media encoded with a computer program comprising program code means for performing the method of claim 1 when said program is run on a computer.

10. A method for decoding a video signal wherein image compression is performed and multiple temporal predictions are used wherein multiple prediction frames are stored in a memory wherein a temporal prediction frame ($R_{n-1}$) in memory of an enhancement stream encoder is overwritten with a separately produced prediction frame, derived from a base stream encoder.

11. The method of claim 10, wherein the overwritten prediction frame in memory ($R_{n-1}$) is one or more of the prediction frames longest in memory.

12. The method of claim 11, wherein the one or more of the prediction frames longest in said memory is one of: the longest prediction frame in memory, the two longest prediction frames in said memory, the next to longest prediction frame in said memory.

13. The method of claim 10, wherein the frame derived from the base stream encoder is upscaled/de-interlaced.

14. The method of claim 10, wherein a temporal prediction frame is overwritten with a view based on the depth frame from a depth base stream encoder and a frame from a view base stream encoder.

15. The method of claim 10, wherein the frame rates for enhancement stream and base stream by a factor different of 2.

16. A non-transitory computer readable media encoded with a computer program product comprising program code means for performing the method of claim 10 when said program is run on a computer.

17. The method of claim 10, wherein scalable compression is performed.

18. A non-transitory computer readable media encoded with a video signal comprising image data and control information wherein the control information comprises one or more parameters for use in the method of claim 10.

19. An encoder for a video signal wherein image compression is performed wherein the encoder is arranged for generating multiple temporal predictions and store the multiple temporal predictions in a memory of an enhancement stream encoder wherein the encoder is arranged to overwrite a temporal prediction frame ($R_n$1) stored in said memory with a separately produced prediction frame derived from a base stream encoder.

20. The encoder of claim 19, wherein the encoder is arranged to overwrite one or more of the prediction frames longest in memory.

21. The method of claim 20, wherein the one or more of the prediction frames longest in said memory is one of: the longest prediction frame in memory, the two longest prediction frames in said memory, the next to longest prediction frame in said memory.

22. The encoder of claim 19, wherein the encoder has means for upscaling/de-interlacing the frame from the base stream encoder is.

23. The encoder of claim 19, wherein a temporal prediction frame is overwritten with a depth view frame.

24. The encoder of claim 19, wherein the frame rates for enhancement stream and base stream differ by a factor different from 2.

25. The encoder of claim 19 wherein the encoder is arranged for scalable compression.

26. A decoder for a compressed video signal wherein the encoder is arranged for generating multiple temporal predictions and store the multiple temporal predictions in a memory of an enhancement stream decoder, wherein the decoder is arranged to overwrite a temporal prediction frame ($R_{n-1}$) in said memory with a separately produced prediction frame derived from a base stream decoder.

27. The decoder of claim 26, wherein the decoder is arranged to overwrite one or more prediction frames longest in memory.

28. The method of claim 27, wherein the one or more of the prediction frames longest in said memory is one of: the longest prediction frame in memory, the two longest prediction frames in said memory, the next to longest prediction frame in said memory.

29. The decoder of claim 26, wherein the decoder has means for upscaling/de-interlacing the frame from the base stream decoder.

30. The decoder of claim 26, wherein a temporal prediction frame is overwritten with a depth view frame.

31. The decoder of claim 26, wherein the frame rates for enhancement stream and base stream differ by a factor different from 2.

32. The decoder of claim 26 wherein the decoder is arranged for decoding a scalable compressed video signal.

33. A non-transitory computer readable media encoded with a compressed image signal, comprising an identification code that specifies which one of a number of predetermined prediction models is used for at least a region of the image of the image signal when the signal is introduced to the processor of an enhancement encoder, wherein the specified prediction model operates on temporal prediction frames stored in a predetermined memory associated with said at least a region of the image of the image signal and wherein at least one temporal prediction frame stored in said predetermined memory is overwritten with a separately produced prediction frame derived from a base stream encoder.

34. The non-transitory computer readable media encoder of claim 33, wherein the encoder is arranged to overwrite one or more prediction frames longest in memory.

35. The non-transitory computer readable media of claim 34, wherein the one or more of the prediction frames longest in said memory is one of: the longest prediction frame in memory, the two longest prediction frames in said memory, the next to longest prediction frame in said memory.

36. A non-transitory computer readable media encoded with a compressed image signal, comprising an identification code that specifies which one of a number of predetermined prediction models is used for at least a region of the image of the image signal when the signal is introduced to the processor of an enhancement decoder, wherein the specified prediction model operates on temporal prediction frames stored in a predetermined memory associated with said at least a region of the image of the image signal and wherein at least one temporal prediction frame stored in said predetermined memory is overwritten with a separately produced prediction frame derived from a base stream encoder.

37. The non-transitory computer readable media decoder of claim 36, wherein the encoder is arranged to overwrite one or more prediction frames longest in memory.

38. The non-transitory computer readable media method of claim 37, wherein the one or more of the prediction frames longest in said memory is one of: the longest prediction frame in memory, the two longest prediction frames in said memory, the next to longest prediction frame in said memory.

* * * * *